Oct. 30, 1945.   D. BERMAN   2,388,111
SANITARY FLUID DISPENSING DEVICE
Filed April 7, 1944    2 Sheets-Sheet 1

INVENTOR:
DAVID BERMAN
By John J. Lynch
Atty.

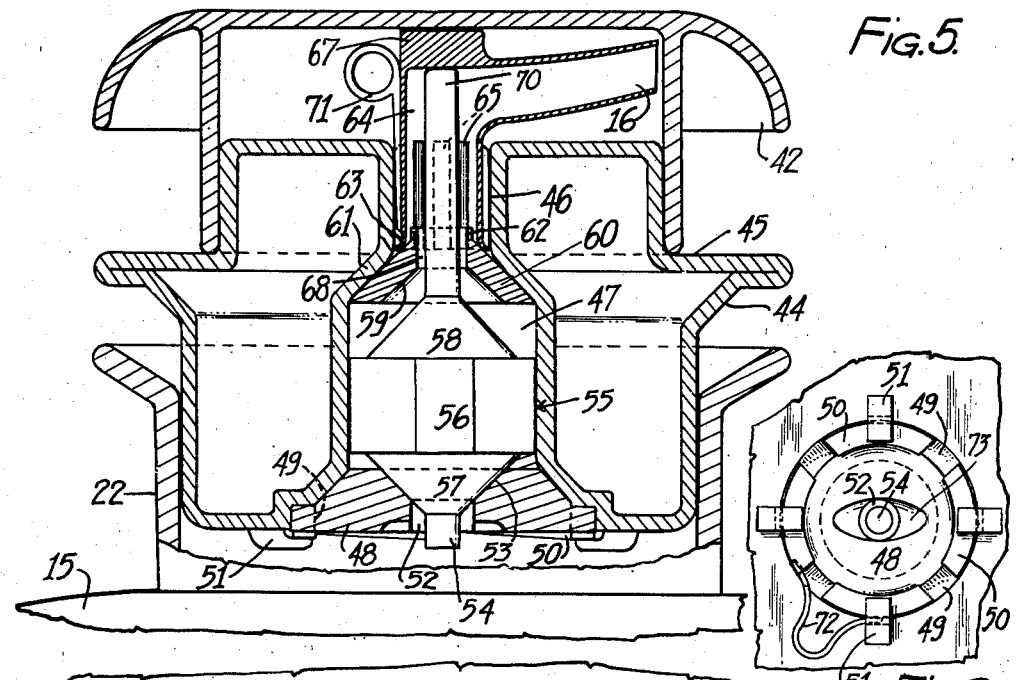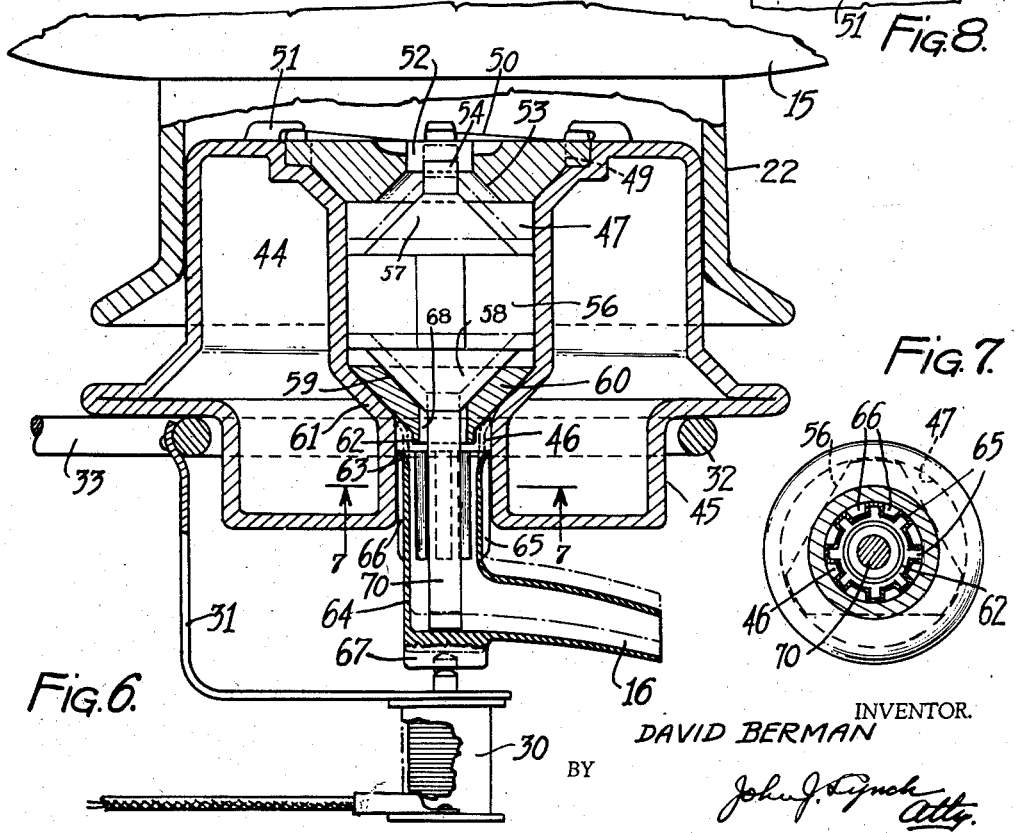

Patented Oct. 30, 1945

2,388,111

UNITED STATES PATENT OFFICE 2,388,111

SANITARY FLUID DISPENSING DEVICE

David Berman, Brooklyn, N. Y., assignor of one-half to Marvin Makransky, Brooklyn, N. Y.

Application April 7, 1944, Serial No. 529,943

17 Claims. (Cl. 222—165)

This invention relates to fluid containers and dispensing means associated therewith and in particular to a sanitary type of container in which milk may be held or dispensed without opening the container to the atmosphere.

A particular object of the invention is to provide a sanitary sealing and dispensing valve which can be inserted into the top opening of a regulation milk can and becomes a removable part thereof so that it is sterilized with the empty can and seals the full can and is used as a dispensing agent without the necessity of adjusting operation that would unseal the can and permit contamination of the contents.

A further object is to provide a dispensing valve having a minimum number of parts and of such construction that the whole may be thoroughly cleaned and kept in a sanitary condition at all times, the structure being so arranged that conditioning of the mechanism for dispensing operations does not interfere with the sealing function of the valve member. A still further object is to provide a frame or holder that is incorporated inside a dispensing cabinet which receives the full can and permits it to be swung to dispensing position with a minimum of manual effort and time and allows the valve to be automatically operated by coin controlled actuating means. A sealing member is applied to the filled can so that the valve can not be tampered with, thus insuring the delivery of the fluid in a sanitary condition to the dispensing means.

Still further objects of the invention include the provision of a valve operating means for use in fluid dispensing operations which is automatically positioned for use when the container is swung into dispensing position in a suitable cabinet so that the fluid, milk or coffee for instance can be made available at any selected location by the insertion of a coin in the dispensing device, it being impossible for the attendant that places the container in the dispensing device to touch any of the parts that come into contact with the fluid. Also the parts of the valve are so made that they comply with the sanitary regulations of different localities where such regulations are stringent.

Figure 3:
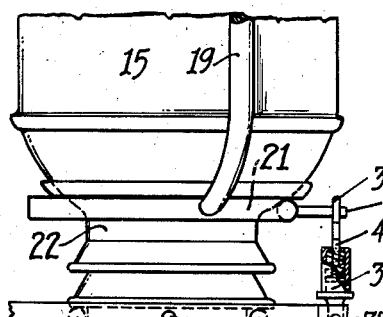
Figure 1:
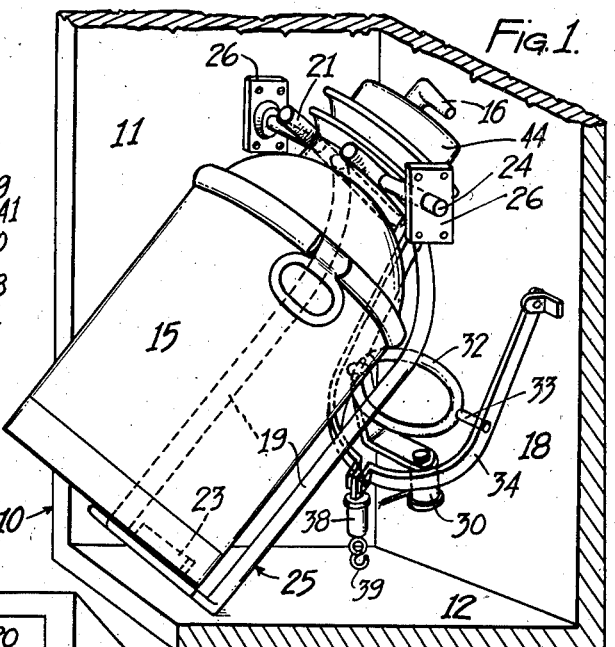
Figure 2:
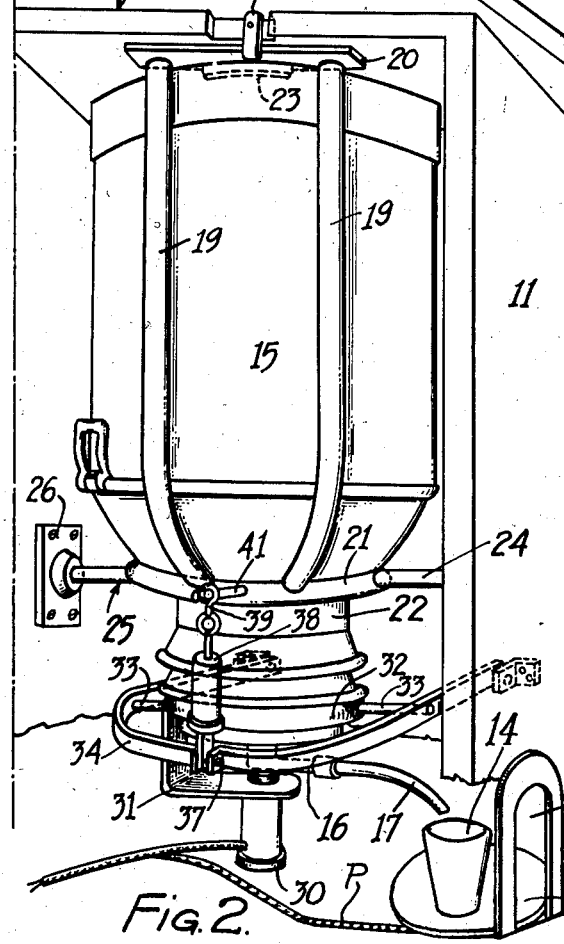
Figure 4:
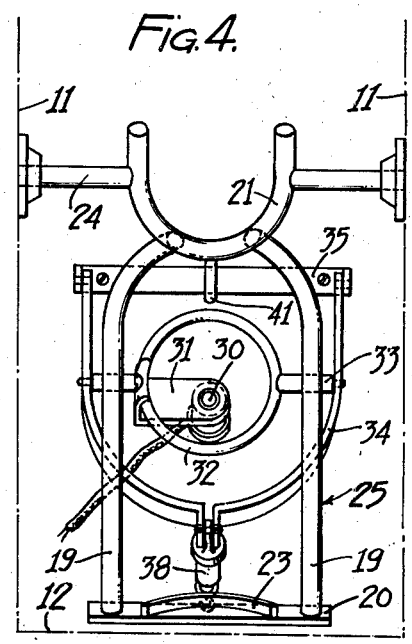

With these and other objects in view, the invention comprises certain constructions hereinafter described and then particularly pointed out in the claims and a preferred embodiment of my invention is illustrated in the accompanying drawings in which:

Figure 1 is a view in perspective of the lower interior portion of a dispensing cabinet in which is incorporated the container holding means that is employed in positioning the can for dispensing operation, Figure 2 is a similar view of the upper portion of the dispensing cabinet showing the holding means swung up to support the can in dispensing position, Figure 3 is a fragmentary view of the lower end of the fluid container showing the connection between the container support means and the dispensing control means, Figure 4 is a view in front elevation of the parts of the container supporting means as they would appear ready to receive the container, Figure 5 is a view in section of the upper end of the container in its upright position showing the arrangement therein of our novel dispensing and sealing valve means, Figure 6 is a view similar to Figure 5 showing the container in inverted or dispensing position and showing the valve parts in inverted sealing relation with respect to the container, and Figure 7 is a section on the line 7—7 of Figure 6 showing the venting structure of the spout and the shape of the dispensing valve.

Figure 8 is a fragmentary plan view of the closure disk and means for locking it in place.

Referring to the drawings in detail, 10 indicates a cabinet of substantially rectangular construction having the side walls 11 and bottom 12, in the former of which is provided a niche 13 in which a cup 14 is placed to receive the fluid dispensed from the container 15 through a removable spout 16 and nozzle 17.

The container is supported in a cradle-like structure including vertical bars 19 connected at their opposite ends by the footpiece 20 and yoke 21. The latter is arranged to receive, in snug fit, the neck 22 of a can or container 15 that is placed on the foot piece 20 so that a cleat 23 on said foot piece engages beneath the lower flanged edge of the can and prevents it from slipping out of the holder or support, designated generally by the numeral 25, and referred to sometimes as the cradle.

The yoke 21 has trunnions 24 which are journalled in brackets 26 attached to the side walls 11 of the cabinet, and upon which the cradle can be swung from the position illustrated in Figure 1 to the position shown in Fig. 2 to place the can in fluid dispensing position, in which position the cradle or support is held by a latch 27 in the top of the cabinet. When the can has been positioned as shown in Figure 2, it is operated for dispensing by an electrically controlled solenoid 30 carried in a solenoid bracket 31 that is attached to one side of a ring 32 whose trunnions 33 mount it for swinging and self seating movement, about the recessed end of a fluid valve, in a pivoted bracket 34. The bracket 34 is of substantial U-shape and the ends of its legs are hinged to a single bracket 35 as shown in Figure 4 or to individual brackets as seen in Figures 1 and 2.

The solenoid is controlled by a well known coin controlled mechanism which forms no part of the present invention and is not shown, it being sufficient to note that when a coin is inserted in the cabinet the solenoid control mechanism is effective to hold the solenoid in raised position a sufficient length of time to permit the desired quantity of fluid to be dispensed as will be later described.

In order to hold the ring 32 firmly in valve engaging position, the bracket 34 has pivoted thereto as at 37 a cylinder 38, in which a spring restrained piston operates to permit the hook end 39 of the piston shank 40 to yieldably engage a pin 41 on the yoke 21 when the bracket 34 is swung up to the position shown in Figure 2.

Referring to the Figures 5, 6 and 7, the numeral 22 indicates the neck of a standard milk can, it being understood that while milk is referred to, any other fluid can be dispensed. The handling of milk with its sanitary requirements imposes conditions of construction and design on dispensing means that would not ordinarily be met with and to this end, the valve structure of my present invention is of novel character and functions to seal the can both in its upright and inverted positions so that the contents at all times is maintained in a sanitary condition. The neck of the can normally is closed by a cover 42 which slips into the slightly tapered neck portion 22. My invention contemplates the use of this standard cover as a closure for the valve member to and from the can filling and sterilizing plant and it is removed when the can is placed in the cabinet.

The valve member comprises the valve housing 44, of solid or hollow construction as desired, and shaped to present an external recessed edge 45 slightly tapered to receive the cover 42 when the can is upright as in Figure 5, and to receive the ring 32 when the can is in dispensing position. The housing is provided with a central bore of varying diameters 46 and 47, the latter constituting a valve chamber and the former a spout bore for receiving the valve operating spout 16. One end of the bore is closed by a disk 48 having edge notches 49 and locking inclines 50 which wedge the valve seat disk 48 in place in the valve housing when it is revolved beneath the locking lugs 51 that protrude from said housing. The disk 48 has a valve stem bore 52 which opens outwardly from an internal valve seat 53 the bore accommodating a short valve stem 54. The stem 54 is part of a fluid flow control valve 55 whose triangularly shaped body 56 carries at opposite sides thereof the valve seats 57 and 58, which are cone shaped and engage respectively the valve seats 53 and 59, the latter of which is formed in an annular ring 60 secured in the valve body or formed integrally therewith at a restricted portion 61 separating the valve chamber 47 and spout bore 46. The valve seat ring 60 is formed with an annular lip 62 over which fits the flared end 63 of the spout 16. The spout is slidably mounted in the bore 46 and is of elbow shape providing a vertical tubular portion 64 which is ribbed as at 65 to provide venting grooves 66 which terminate in the flared end 63 so that as fluid is released by the raising of the spout actuated stem 70, as indicated in outline in Figure 6, the fluid will not run outside the spout, but in passing through the bore 68 of ring 60 will be directed into the spout 16 by the rim or lip 62 which projects into said spout when the latter is raised in a fluid dispensing action. When the spout or elbow is raised by action of the solenoid 30, upon which the foot portion 67 of the spout rests when the can is inverted, it raises the valve 56 through the medium of the long stem portion 70 which is engaged by the inside of the foot portion of the spout to lift the valve for dispensing the fluid or for jamming the valve shut when the can is upright as shown in Figure 5. The jamming action is provided by using a taper pin 71 which fits into one of the vent grooves of the spout and wedges the spout tightly in place against the end of the valve stem 70 when the can is upright.

When the can is received by the attendant at the dispensing cabinet, the sealing means (not shown) is broken and the cover 42 removed. Then the can is placed in the cradle 25 and swung up to the inverted position of Figure 2. Then the ring support and associated bracket are swung up and attached to the cradle by the yieldable connector hook 39 to position the solenoid beneath the spout.

The taper pin 71 is then removed and the spout drops to engage the solenoid, at the same time dropping the valve to open seat 53 and close seat 59 to prevent any escape of the fluid, and thus seal the can when in its inverted position, as shown in Figure 6. Operation of the solenoid will raise the valve off seat 59 to allow fluid to flow through the spout and through a nozzle, if one is used, to fill a cup 14. It is evident that when the can is in transit the valve on seat 53 effectively seals the can and maintains the contents in sanitary condition. When the can is inverted and not in dispensing action, the valve on seat 59 seals the can in the same manner. In dispensing coffee, the heat may loosen the disk 48 and in order to prevent this I employ a spring clip 72 which maintains the disk in closed position, by having its ends engaging the lug 51 and a recess in the disk. If desired, a partitioned turntable T may be employed in a completely closed cabinet to revolve a filled cup into the exposed niche 13, the filling of the cup being done inside the dust-proof cabinet and the turntable being revolved in synchronism by suitable power means P.

My invention is not to be restricted to the precise details of construction shown since various changes and modifications may be made therein without departing from the scope of the invention or sacrificing the advantages derived from its use.

What I claim is:

1. The combination with a container having a neck portion and a cover therefore, of a valve structure including a projecting valve stem arranged to be removably fitted into said neck portion when said cover is removed means in said valve structure for receiving the cover to form a closure for said valve structure, and means associated with the cover and said valve stem for engaging the latter to hold the valve closed when the cover is in closure position.

2. The combination with a container having a neck portion and a cover therefore, of a valve means arranged to be fitted into the neck of the container when the cover is removed and constituting a closure for said container, means in said valve means for receiving the cover to form a closure for said valve means and sealing means engaged by the cover for securing the valve means in closed position when the cover is in valve closure position.

3. The combination with a container of a cradle in which said container is positioned uprightly, means for retaining the cradle in an inverted position, a valve in said container for dispensing fluid therefrom, valve operating means including a pivoted bracket and a ring trunnioned therein, said bracket being arranged to be attached to said container when the latter is inverted with said cradle, to position the valve operating means with respect to said container.

4. The combination with a container of a cradle in which the container is placed in upright position, means for pivoting said cradle to invert said container, a valve in the container, and valve controlling means associated with said cradle, including a yoke bracket pivoted for swinging movement beneath the inverted container, and yieldable means for connecting said bracket to the cradle.

5. In a fluid dispensing device, in combination, a fluid container holder, means for pivotally mounting the holder for moving the fluid container to upright and inverted positions, means for latching the holder at inverted position, a dispensing control member, a swinging frame in which said control member is pivotally mounted and yieldable means for securing said frame to the container to position the control member in dispensing relation to said container.

6. In a fluid dispensing device, in combination, a fluid container holder, means for pivotally mounting the holder for moving the fluid container to upright and inverted position, said holder including a foot piece and a yoke portion for engagement with the container to support the same in the holder, means for latching the holder at inverted container holding position, a dispensing control member, means including a pivoted frame and a ring trunnioned in said frame and in which said control member is mounted and means for securing said frame to the container to position the ring against the container and the control member in dispensing relation to the said container.

7. In a fluid dispensing device, in combination, a fluid container holder, means for pivotally mounting the holder for moving the fluid container to upright and inverted position a control valve in the container, means for retaining the holder at inverted position, a dispensing control member, a frame in which said control member is mounted including a pivoted ring, a bracket in which the ring is mounted said bracket being arranged for swinging movement to position the ring on said container and means carried by said ring for engaging the valve of the container to control the flow of fluid from the container.

8. In a fluid dispensing device, the combination with a fluid container including a dispensing valve, of a holder for the container, means for mounting the holder for swinging movement to position the container in upright and inverted positions, means for detaining the holder to support the container in inverted position, a control member, means for pivotally mounting said control member to position it in operating relation with the valve of said container, when the latter is inverted, and means for yieldably connecting said control member mounting means and said holder.

9. In a fluid dispensing device, the combination with a fluid container including a dispensing valve, of a holder for the container, means for mounting the holder for swinging movement to position the container in upright and inverted positions, means for detaining the holder to support the container in inverted position, a control member, means for pivotally mounting said control member to position it in dispensing control relation with the valve of said container, said mounting means including an articulate bracket, a ring pivoted in the bracket and the control member supported from said ring and means for yieldably connecting said control member mounting means and said holder for retaining the dispensing control member in operative relation with said dispensing valve.

10. In a fluid dispensing device, the combination with a fluid container including a dispensing valve, of a holder for the container, means for mounting the holder for swinging movement to position the container in upright and inverted positions, a solenoid, a bracket for supporting said solenoid, a ring for mounting said bracket, an articulate frame in which the ring is pivoted, said frame being movable to position the ring on the closure unit of said container when the latter is inverted to position the solenoid in valve operating position and means for yieldably connecting said frame and said holder.

11. In a fluid dispensing device, the combination with a container having a neck portion and a cover fitting said neck portion, of a dispensing valve unit including a valve member arranged to fit into said neck portion to form a closure for the container when the cover is removed and means on said unit for receiving the cover to provide a closure for said unit, and a fluid discharge means intermediate the cover and the valve member for holding the latter in closed position when the cover closes said unit.

12. In a fluid dispensing device, the combination with a container having a neck portion and a cover fitting said neck portion, of a dispensing valve unit arranged to fit into said neck portion to form a closure for the container when the cover is removed, said unit comprising a valve chamber presenting oppositely disposed valve seats and a valve movable in the chamber to seal either seat when the container is upright or inverted, means on said unit for receiving the cover to provide a closure for said unit and means engaged by said cover for securing the valve on one seat when the cover is in position on the unit.

13. In a fluid dispensing device, the combination with a fluid container having a neck portion, of a dispensing unit arranged to fit into and close said neck portion, spaced valve seat means defining the opposite ends of a valve chamber in said unit, a valve movable in the chamber to seal one of said seat means when the container is upright and the other of said seat means when the container is inverted, fluid discharge means slidably mounted in the unit, means on the valve for engagement with the discharge means to lift the valve off one seat when said discharge means is moved in fluid dispensing action, and means for fixing said discharge means in the unit to maintain the valve in sealing position on the seat means engaged by said valve when the container is in upright position.

14. In a fluid dispensing device, the combination with a fluid container having a neck portion and a cover fitting said neck portion, of a dispensing valve unit arranged, when the cover is removed, to fit into and close said neck portion, spaced valve seat means defining the ends of a valve chamber in said unit, a valve movable in said chamber to seal one of said seat means when the container is upright and the other of said seat means when the container is inverted, fluid discharge means slidably mounted in the unit, means on the valve for engagement with the discharge means to lift the valve off one seat when said discharge means is moved in fluid dispensing action, means for fixing said discharge means in the unit to maintain the valve in sealing position on the seat, means engaged by said valve when the container is in upright position and means on said unit for receiving the cover to provide a closure for said unit.

15. In a fluid dispensing device, the combination with a fluid container, of a dispensing valve unit forming a closure for the container and including a valve chamber presenting oppositely disposed valve seats and a valve movable in the chamber to seal either seat when the container is upright or inverted, a fluid discharge means in the unit for actuating said valve, a holder for the container, means for mounting the holder for swinging movement to position the container in upright and inverted positions, a control member for engagement with said discharge means to move the latter in fluid dispensing action, means for pivotally mounting said control member to position it in dispensing control relation with said discharge means, and means for joining said control member mounting means and said holder.

16. In a fluid dispensing device as set forth in claim 13, a lip on one of said valve seat members, a flare on the end of the fluid discharge means into which the lip extends in fluid discharge action and venting grooves on said discharge means.

17. The combination with a container having a neck portion and a cover, of a valve housing including a slidable valve fitting therein and arranged to seal the container when the container is in either upright or inverted position, means on said housing for receiving the cover, and a pouring spout associated with the valve and engageable by the cover to keep the valve in closed position.

DAVID BERMAN.